United States Patent
Nagao

(10) Patent No.: US 12,351,896 B2
(45) Date of Patent: Jul. 8, 2025

(54) STEEL MATERIAL FOR HIGH-PRESSURE HYDROGEN GAS ENVIRONMENT, STEEL STRUCTURE FOR HIGH-PRESSURE HYDROGEN GAS ENVIRONMENT, AND METHODS FOR PRODUCING STEEL MATERIAL FOR HIGH-PRESSURE HYDROGEN GAS ENVIRONMENT

(71) Applicant: JFE STEEL CORPORATION, Tokyo (JP)

(72) Inventor: Akihide Nagao, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 870 days.

(21) Appl. No.: 17/418,322

(22) PCT Filed: Dec. 19, 2019

(86) PCT No.: PCT/JP2019/049853
§ 371 (c)(1),
(2) Date: Jun. 25, 2021

(87) PCT Pub. No.: WO2020/137812
PCT Pub. Date: Jul. 2, 2020

(65) Prior Publication Data
US 2022/0064770 A1 Mar. 3, 2022

(30) Foreign Application Priority Data
Dec. 26, 2018 (JP) .................. 2018-242130

(51) Int. Cl.
C22C 38/58 (2006.01)
C21D 9/08 (2006.01)
C21D 9/46 (2006.01)
C22C 38/00 (2006.01)
C22C 38/02 (2006.01)
C22C 38/06 (2006.01)
C22C 38/42 (2006.01)
C22C 38/44 (2006.01)
C22C 38/46 (2006.01)
C22C 38/48 (2006.01)
C22C 38/50 (2006.01)
C22C 38/54 (2006.01)
F17C 1/14 (2006.01)

(52) U.S. Cl.
CPC ............ *C22C 38/58* (2013.01); *C21D 9/08* (2013.01); *C21D 9/46* (2013.01); *C22C 38/001* (2013.01); *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *F17C 1/14* (2013.01); *F17C 2203/0639* (2013.01); *F17C 2221/012* (2013.01)

(58) Field of Classification Search
None
See application file for complete search history.

(56) References Cited

U.S. PATENT DOCUMENTS

2009/0285713 A1 11/2009 Omura et al.
2015/0047754 A1 2/2015 Lee

FOREIGN PATENT DOCUMENTS

| CN | 1990894 A | 7/2007 |
|---|---|---|
| CN | 101368251 A | 2/2009 |
| CN | 108026619 A | 5/2018 |
| EP | 2 980 247 A1 | 2/2016 |
| EP | 3 351 650 A1 | 7/2018 |
| JP | 2005-2386 A | 1/2005 |
| JP | 2009-46737 A | 3/2009 |
| JP | 2009-74122 A | 4/2009 |
| JP | 2009-275249 A | 11/2009 |
| JP | 2010-37655 A | 2/2010 |
| JP | 2012-107332 A | 6/2012 |
| JP | 2012-107333 A | 6/2012 |
| JP | 2014-198878 A | 10/2014 |
| JP | 2014-227573 A | 12/2014 |
| JP | 5633664 B1 | 12/2014 |
| JP | 2018-12855 A | 1/2018 |

OTHER PUBLICATIONS

Machine translation of CN 1990894 A. (Year: 2007).*
Machine translation of JP 2018-012855A. (Year: 2018).*
Jun. 30, 2022 Office Action issued in Chinese Patent Application No. 201980086056.4.
Apr. 27, 2021 Office Action issued in Japanese Patent Application No. 2020-519146.
Feb. 7, 2022 Extended Search Report issued in European Patent Application No. 19902477.9.
Matsumoto, T. et al. "Effect of Displacement Velocity on Elastic Plastic Fracture Toughness of SM490B Carbon Steel Plate in 0.7 MPa Hydrogen Gas*" vol. 79, No. 804, pp. 1210-1225, 2013.
Matsuoka, S. et al. "Test Methods for Threshold of Hydrogen-Induced Crack Growth, KI,H, of SCM435 in 115 Mpa Hydrogen Gas", The Japan Society of Mechanical Engineers, OS16-10, pp. 813-815, 2016.

(Continued)

*Primary Examiner* — Xiaowei Su
(74) *Attorney, Agent, or Firm* — Oliff PLC

(57) ABSTRACT

A steel material and methods for producing the same. The steel material exhibits excellent hydrogen embrittlement resistance in a high-pressure hydrogen gas environment and is, therefore, suitable for use in hydrogen storage tanks, hydrogen line pipes, and the like. The steel material has a specified chemical composition, a tensile strength of 560 MPa or higher, and a fracture toughness value $K_{IH}$ exhibited by the steel material in a high-pressure hydrogen gas atmosphere is 40 MPa·m$^{1/2}$ or higher.

10 Claims, No Drawings

(56) References Cited

OTHER PUBLICATIONS

Mar. 24, 2020 International Search Report issued in International Application No. PCT/JP2019/049853.
Nov. 17, 2022 Office Action issued in Korean Patent Application No. 10-2021-7019452.
Feb. 7, 2025 Office Action issued in European Application No. 19902477.9.

* cited by examiner

STEEL MATERIAL FOR HIGH-PRESSURE HYDROGEN GAS ENVIRONMENT, STEEL STRUCTURE FOR HIGH-PRESSURE HYDROGEN GAS ENVIRONMENT, AND METHODS FOR PRODUCING STEEL MATERIAL FOR HIGH-PRESSURE HYDROGEN GAS ENVIRONMENT

TECHNICAL FIELD

This application relates to a steel material and a steel structure that are suitable for use in a high-pressure hydrogen gas environment and to methods for producing a steel material for a high-pressure hydrogen gas environment. In particular, the application relates to improvement in hydrogen embrittlement resistance exhibited by a steel material in a high-pressure hydrogen gas environment.

BACKGROUND

Hydrogen has been attracting significant worldwide attention in recent years because hydrogen can be a clean energy source, and diversification of energy is being considered. In particular, high expectations are placed on fuel cell vehicles that use high-pressure hydrogen gas as a fuel source. Accordingly, the development of fuel cell vehicles is being widely advanced worldwide, and some fuel cell vehicles have been put into practical use.

Fuel cell vehicles run on hydrogen stored in a tank instead of gasoline, which is conventionally used. Accordingly, in place of gasoline stations, hydrogen stations where fuel replenishment can be performed are necessary. For achieving widespread use of fuel cell vehicles, it is important to build, in ordinary urban districts, a large number of hydrogen stations where fuel replenishment can be performed.

In hydrogen stations, typically, a vehicle-mounted hydrogen fuel tank is directly filled with hydrogen from a hydrogen storage tank that stores hydrogen at high pressure, by using a pressure differential method. It is assumed that a target pressure for filling a vehicle-mounted hydrogen fuel tank is on the order of 70 MPa so that a range comparable to that of gasoline-powered vehicles can be achieved. Accordingly, it is assumed that the pressure of the storage tank of a hydrogen station needs to be higher, that is, on the order of 82 MPa. Hence, it is required that storage tanks of hydrogen stations be able to store and supply hydrogen safely in a high-pressure hydrogen gas environment.

Furthermore, instances in which transportation of large amounts of hydrogen gas is carried out by utilizing a pipeline are anticipated. In such instances, the transport pressure is on the order of 10 MPa, and, therefore, the line pipes are exposed to a hydrogen gas pressure on the order of 10 MPa.

Thus, steel structures for hydrogen, such as storage tanks of hydrogen stations, which store and supply high-pressure hydrogen gas, and line pipes that are utilized for mass transportation of hydrogen gas, are used while being exposed to a high-pressure hydrogen gas environment.

One possible material for steel structures is a low-alloy steel material, which has the advantages of being inexpensive and having high strength. However, low-alloy steel materials have the problem of becoming brittle when hydrogen is absorbed into the alloys, that is, the problem of susceptibility to a so-called "hydrogen embrittlement".

Accordingly, in the related art, austenitic stainless steel, such as SUS316L, which is less susceptible to hydrogen embrittlement than low-alloy steels, has been utilized in steel structures that are used in a high-pressure hydrogen gas environment. However, austenitic stainless steel, such as SUS316L, comes with a high cost of the steel material and, in addition, has low strength; therefore, in cases where austenitic stainless steel is designed to withstand a high hydrogen pressure, the steel has a large thickness, and the price of the resulting structure for hydrogen is increased. Accordingly, there has been a strong need for, as a material for steel structures for hydrogen, a low-alloy steel material that is less expensive and can withstand a high-pressure hydrogen gas environment.

To address this need, Patent Literature 1, for example, proposes a steel for a high-pressure hydrogen environment. The steel for a high-pressure hydrogen environment described in Patent Literature 1 is a steel that is used in a high-pressure hydrogen environment, the steel having a chemical composition containing, in mass %, C: 0.03 to 0.18%, Si: 0.1 to 0.5%, Mn: 0.2 to 1.8%, P: 0.025% or less, S: 0.002 to 0.02%, sol. Al: 0.01 to 0.10%, and Ca: 0.001 to 0.10% and optionally further containing V: 0.03 to 0.3%, wherein Ca/S: less than 1.5 or 11 or more, with the balance being Fe and incidental impurities. According to the technology described in Patent Literature 1, MnS or Ca complex inclusions and VC, which serve as trap sites for diffusible hydrogen, are formed to convert diffusible hydrogen to non-diffusible hydrogen, thereby reducing a diffusible hydrogen concentration ratio to inhibit embrittlement due to diffusible hydrogen.

Furthermore, Patent Literature 2 proposes a high-strength low-alloy steel excellent in high-pressure hydrogen environment embrittlement resistance characteristics. The high-strength low-alloy steel described in Patent Literature 2 is a high-strength steel having a composition containing, in mass, C: 0.10 to 0.20%, Si: 0.10 to 0.40%, Mn: 0.50 to 1.20%, P: 0.005% or less, S: 0.005% or less, Cr: 0.20 to 0.80%, Cu: 0.10 to 0.50%, Mo: 0.10 to 1.00%, V: 0.01 to 0.10%, B: 0.0005 to 0.005%, and N: 0.01% or less, with the balance being Fe and incidental impurities. According to Patent Literature 2, it is preferable that quenching be performed at 920° C. or higher, and subsequently, a tempering process be performed at a relatively high temperature within a range of 600 to 640° C. to adjust a tensile strength to be in a very narrow range of 900 to 950 MPa. Patent Literature 2 states that, as a result, the high-strength low-alloy steel excellent in high-pressure hydrogen environment embrittlement resistance characteristics exhibits excellent elongation and drawing characteristics even in a 45 MPa hydrogen atmosphere.

Furthermore, Patent Literature 3 proposes a high-strength low-alloy steel excellent in high-pressure hydrogen environment embrittlement resistance characteristics. The high-strength low-alloy steel described in Patent Literature 3 is a Cr—Mo high-strength low-alloy steel having a composition containing, in mass %, C: 0.10 to 0.20%, Si: 0.10 to 0.40%, Mn: 0.50 to 1.20%, P: 0.005% or less, S: 0.002% or less, Ni: 0.75 to 1.75%, Cr: 0.20 to 0.80%, Cu: 0.10 to 0.50%, Mo: 0.10 to 1.00%, V: 0.01 to 0.10%, B: 0.0005 to 0.005%, and N: 0.01% or less and further containing one or both of Nb: 0.01 to 0.10% and Ti: 0.005 to 0.050%, with the balance being Fe and incidental impurities. According to Patent Literature 3, it is preferable that normalizing be performed at 1000 to 1100° C., quenching be performed from a temperature range of 880 to 900° C., and thereafter, a tempering process be performed at a relatively high temperature of 560 to 580° C., to ensure that a grain size after thermal refining is 8.4 or higher in terms of a grain size number and adjust a tensile strength to be in a very narrow range of 900 to 950 MPa. Patent Literature 3 states that, as a result, the high-strength low-alloy steel excellent in high-pressure hydrogen environment embrittlement resistance characteristics exhibits excellent elongation and drawing characteristics even in a 45 MPa hydrogen atmosphere.

Furthermore, Patent Literature 4 proposes a low-alloy steel for a high-pressure hydrogen gas environment. The low-alloy steel described in Patent Literature 4 is a low-alloy steel for a high-pressure hydrogen gas environment and has a composition containing, in mass %, C: 0.15 to 0.60%, Si: 0.05 to 0.5%, Mn: 0.05 to 3.0%, P: 0.025% or less, S: 0.010% or less, Al: 0.005 to 0.10%, Mo: 0.5 to 3.0%, V: 0.05 to 0.30%, O (oxygen): 0.01% or less, and N: 0.03% or less, with the balance being Fe and incidental impurities, the low-alloy steel having a tensile strength of 900 MPa or higher. Note that Patent Literature 4 states that the composition described above may additionally contain B: 0.0003 to 0.003%. Patent Literature 4 states that, in this instance, it is preferable that the N content be adjusted to 0.010% or less. Patent Literature 4 states that, in the technology described therein, V is to be added, a Mo content is to be increased compared with existing steels, a tempering temperature is to be increased, and V—Mo carbides are to be utilized; as a result, a carbide morphology at grain boundaries is improved, and, consequently, hydrogen environment embrittlement resistance is significantly improved.

Furthermore, Patent Literature 5 proposes a steel for a high-pressure hydrogen gas storage container, the steel having excellent hydrogen resistance. The steel for a high-pressure hydrogen gas storage container described in Patent Literature 5 is a steel having a composition containing, in mass %, C: 0.12 to 0.15%, Si: 0.01 to 0.10%, Mn: 0.30 to 0.60%, P: 0.02% or less, S: 0.005% or less, Cr: 2.00 to 2.50%, Mo: 0.90 to 1.20%, V: 0.20 to 0.35%, Nb: 0.01 to 0.06%, and Ti: 0.002 to 0.030%, with the balance being Fe and incidental impurities, wherein an MC carbide precipitation index MCI=(0.24V+0.06Mo)/C of 0.70 or higher is satisfied. Patent Literature 5 states that, in the technology described therein, during the production of a steel plate, stress relief annealing that lasts for a long time is to be performed on a steel having the above-described composition after a normalizing process: as a result, MC carbides (Mo, V) C are dispersively precipitated in a refined and dense form, and, consequently, hydrogen resistance exhibited by the steel, such as hydrogen embrittlement resistance, is improved.

Furthermore, Patent Literature 6 proposes a steel material for storage of high-pressure hydrogen. The steel material described in Patent Literature 6 is a steel material containing, in mass %, C: 0.05 to 0.12%, Si: 0.01 to 0.50%, Mn: more than 0.6 to 1.8%, P: 0.02% or less, S: 0.003% or less, and Al: 0.01 to 0.08%, with the balance being Fe and incidental impurities, the steel material having a metallurgical structure formed primarily of bainite, which is present in an area fraction of 90% or higher, with cementite being dispersively precipitated in the bainite, the cementite having an average particle diameter of 50 nm or less and an average aspect ratio of 3 or less. Patent Literature 6 states that, in the technology described therein, fine cementite having a low aspect ratio is to be dispersed; as a result, an amount of hydrogen absorption from a high-pressure hydrogen atmosphere is reduced, the toughness of the base metal is improved, and, consequently, embrittlement due to hydrogen is inhibited.

Furthermore, Patent Literature 7 proposes a high-strength steel material for a high-pressure hydrogen storage container. The high-strength steel material described in Patent Literature 7 is a high-strength steel material containing, in mass %, C: 0.05 to 0.15%, Si: 0.01 to 0.50%, Mn: more than 0.6 to 2.5%, P: 0.02% or less, S: 0.003% or less, and Al: 0.01 to 0.08%, wherein Pcm is 0.19 or higher, with the balance being Fe and incidental impurities, the steel material having a metallurgical structure including lower bainite, which is present in an area fraction of 70% or more, and a martensite-austenite constituent, which is present in an area fraction of 3% or less, and the steel material having a tensile strength of 780 MPa or higher. Patent Literature 7 states that, in the technology described therein, a lower bainite structure is to be employed, cementite is to be finely precipitated, and the formation of coarse cementite and a martensite-austenite constituent is to be inhibited; as a result, hydrogen absorption is inhibited, and, consequently, embrittlement in a high-pressure hydrogen environment and a decrease in ductility are prevented.

Furthermore, Patent Literature 8 describes a steel material having excellent fatigue crack propagation resistance for a high-pressure hydrogen environment. The steel material described in Patent Literature 8 is a steel material having a chemical composition containing, in mass %, C: 0.05 to 0.60%, Si: 0.01 to 2.0%, Mn: 0.3 to 3.0%, P: 0.001 to 0.040%, S: 0.0001 to 0.010%, N: 0.0001 to 0.0060%, and Al: 0.01 to 1.5%, the chemical composition further containing one or more of Ti: 0.01 to 0.20%, Nb: 0.01 to 0.20%, and V: 0.01% or more and less than 0.058, and the chemical composition further containing one or more of B: 0.0001 to 0.01%, Mo: 0.005 to 2.0%, and Cr: 0.005 to 3.0%; the steel material having a microstructure in which tempered martensite is present in a volume fraction of 95% or higher, precipitates including at least one of Ti, Nb, and V and at least one of carbon and nitrogen and having a diameter of 100 nm or less are present in a density of 50 particles/$\mu m^2$ or higher, and a prior austenite grain diameter is 3 μm or larger. Patent Literature 8 states that, with the technology described therein, fatigue crack propagation speed in a high-pressure hydrogen environment with a pressure of 80 MPa or higher is dramatically reduced compared with existing steels; therefore, the service life of hydrogen storage tanks and the like that are used in a high-pressure hydrogen environment is improved, and the safety of hydrogen storage containers that are used in a high-pressure hydrogen environment is improved.

Note that Non Patent Literature 1 and Non Patent Literature 2 provide a fracture toughness value of a low-alloy steel.

CITATION LIST

Patent Literature

PTL 1: Japanese Unexamined Patent Application Publication No. 2005-2386
PTL 2: Japanese Unexamined Patent Application Publication No. 2009-46737
PTL 3: Japanese Unexamined Patent Application Publication No. 2009-275249
PTL 4: Japanese Unexamined Patent Application Publication No. 2009-74122
PTL 5: Japanese Unexamined Patent Application Publication No. 2010-37655
PTL 6: Japanese Unexamined Patent Application Publication No. 2012-107332
PTL 7: Japanese Unexamined Patent Application Publication No. 2012-107333
PTL 8: Japanese Patent No. 5633664

Non Patent Literature

NPL 1: MATSUMOTO Takuya et al., Transactions of the Japan Society of Mechanical Engineers Series A, Vol. 79, No. 804 (2013), pp. 1210-1225

NPL 2: MATSUOKA Saburo et al., M&M 2016 Zairyo Rikigaku Conference (Strength of Materials Conference), OS16-10, (2016), pp. 813-815

SUMMARY

Technical Problem

In particular, in steel structures that are used in a high-pressure hydrogen gas environment, such as hydrogen storage tanks, hydrogen filling is repeatedly performed, and, therefore, the structures (containers) experience cyclic stresses. Accordingly, the designing of a steel structure such as a hydrogen storage tank requires taking fatigue failure into consideration. It is said that a critical point of fatigue failure of a steel structure that is used in a high-pressure hydrogen gas environment is related to a fracture toughness value $K_{IH}$ exhibited by a steel material in hydrogen gas. It is assumed that one effective approach for extending the life of steel structures for hydrogen and improving the safety thereof is to increase the fracture toughness value $K_{IH}$ exhibited by a steel material in hydrogen gas.

For increasing the fracture toughness value $K_{IH}$ exhibited by a steel material in hydrogen gas, a suitable approach is, for example, to reduce upper bainite, which contains coarse carbides.

Unfortunately, a problem has been encountered in that, with the related-art technologies described above, the fracture toughness value $K_{IH}$ exhibited by a steel material in hydrogen gas cannot be sufficiently increased.

The disclosed embodiments have made in view of the problem with the related-art technologies described above, and objects of the disclosed embodiments are to provide a steel material that exhibits excellent hydrogen embrittlement resistance in a high-pressure hydrogen gas environment, the steel material being suitable for use in a steel structure that is used in a high-pressure hydrogen gas environment, examples of the steel structure including hydrogen storage tanks and hydrogen line pipes, to provide a steel structure, and to provide methods for producing a steel material for a high-pressure hydrogen gas environment.

Note that as used herein, the expression "exhibit excellent hydrogen embrittlement resistance in a high-pressure hydrogen gas environment" refers to instances in which the fracture toughness value $K_{IH}$ is 40 MPa·m$^{1/2}$ or higher as determined by conducting a fracture toughness test in a hydrogen gas atmosphere at room temperature (20±10° C.) and a pressure of 115 MPa in accordance with The Japan Pressure container Research Council, Division of Materials Science and Technology, Hydrogen Gas Embrittlement Technical Committee, Task Group V (1991).

Note that when the fracture toughness value $K_{IH}$ is 40 MPa·m$^{1/2}$ or higher, it is possible to design a steel structure for hydrogen, examples of which include storage tanks and line pipes, in which LBB (Leak Before Break) can be established, in a manner such that a thickness range that can be used in a process for producing a steel pipe, such as a seamless steel pipe or a UOE pipe, is ensured.

Furthermore, as used herein, the term "steel material" encompasses steel sheets, steel plates, seamless steel pipes, electric resistance welded steel pipes, shaped steels, steel bars, and the like.

Solution to Problem

To achieve the objects described above, the inventor diligently performed studies regarding various factors that affect the hydrogen embrittlement resistance of carbon steel materials and low-alloy steel materials. As a result, it was newly discovered that in cases where Si, Cu, and Al, each in an amount of 0.5% or more in mass %, are included in combination, with Al being optional, the hydrogen embrittlement resistance exhibited by the steel material in a high-pressure hydrogen gas atmosphere is noticeably improved. Furthermore, it was discovered that in cases where a steel material is cooled uniformly so as to make timings of transformation uniform, a local temperature increase due to localization of heat generation involved in the transformation is inhibited, and, consequently, the formation of martensite or lower bainite is facilitated, which results in an increase in the fracture toughness value $K_{IH}$ exhibited by a steel material in hydrogen gas.

The disclosed embodiments were completed based on the above findings and with additional studies. Specifically, a summary of the disclosed embodiments is as follows.

(1) A steel material for a high-pressure hydrogen gas environment which has a composition containing, in mass %, C: 0.04 to 0.50%, Si: 0.5 to 2.0%, Mn: 0.5 to 2.0%, P: 0.05% or less, S: 0.010% or less, N: 0.0005 to 0.0080%, Al: 0.010% to 2.0%, O: 0.0100% or less, and Cu: 0.5 to 2.0%, with the balance being Fe and incidental impurities, wherein the steel material for a high-pressure hydrogen gas environment has a tensile strength of 560 MPa or higher, and a fracture toughness value $K_{IH}$ exhibited by the steel material in a high-pressure hydrogen gas atmosphere is 40 MPa·m$^{1/2}$ or higher.

(2) The steel material for a high-pressure hydrogen gas environment according to (1), wherein the composition contains, in mass %, Al: 0.5 to 2.0%.

(3) The steel material for a high-pressure hydrogen gas environment according to (1) or (2), wherein the composition additionally contains, in mass %, one or more selected from Ni: 0.05 to 2.00%, Cr: 0.10 to 2.50%, Mo: 0.05 to 2.00%, W: 0.05 to 2.00%, Nb: 0.005 to 0.100%, V: 0.005 to 0.200%, Ti: 0.005 to 0.100%, and B: 0.0005 to 0.0050%.

(4) The steel material for a high-pressure hydrogen gas environment according to any one of (1) to (3), wherein the composition additionally contains, in mass %, one or more selected from Nd: 0.005 to 1.000%, Ca: 0.0005 to 0.0050%, Mg: 0.0005 to 0.0050%, and REM: 0.0005 to 0.0050%.

(5) A steel structure for a high-pressure hydrogen gas environment which comprises the steel material for a high-pressure hydrogen gas environment according to any one of (1) to (4).

(6) The steel structure for a high-pressure hydrogen gas environment according to (5), wherein the steel structure is a storage tank or a line pipe.

(7) A method for producing a steel material for a high-pressure hydrogen gas environment which comprises heating a steel starting material having a composition containing, in mass, C: 0.04 to 0.50%, Si: 0.5 to 2.0%, Mn: 0.5 to 2.0%, P: 0.05% or less, S: 0.010% or less, N: 0.0005 to 0.0080%, Al: 0.010% to 2.0%, O: 0.0100% or less, and Cu: 0.5 to 2.0%, with the balance being Fe and incidental impurities, to a temperature of $Ac_3$ transformation temperature or higher and then hot-rolling the steel starting material to form a steel material having a predetermined shape; and thereafter subjecting the steel material to an accelerated cooling process, in which the steel material is cooled from a temperature of ($Ar_3$ transformation temperature −50° C.) or higher to a cooling stop temperature of 600° C. or less at a cooling rate of 1 to 200° C./s, wherein the steel material for a high-pressure hydrogen gas environment has a tensile strength of 560 MPa or higher, and a fracture toughness value $K_{IH}$ exhibited by the steel material in a high-pressure hydrogen gas atmosphere is 40 MPa·m$^{1/2}$ or higher.

(8) A method for producing a steel material for a high-pressure hydrogen gas environment which comprises heating a steel starting material having a composition containing, in mass %, C: 0.04 to 0.50%, Si: 0.5 to 2.0%, Mn: 0.5 to 2.0%, P: 0.05% or less, S: 0.010% or less, N: 0.0005 to 0.0080%, Al: 0.010% to 2.0%, O: 0.0100% or less, and Cu: 0.5 to 2.0%, with the balance being Fe and incidental impurities, to a temperature of $Ac_3$ transformation temperature or higher and then hot-rolling the steel starting material to form a steel material having a predetermined shape; and thereafter subjecting the steel material to a direct quenching-tempering process, in which the steel material is cooled from a temperature of ($Ar_3$ transformation temperature− 50° C.) or higher to a cooling stop temperature of 250° C. or lower at a cooling rate of 1 to 200° C./s, and further, the steel material is tempered at a temperature of $Ac_1$ transformation temperature or lower, wherein the steel material for a high-pressure hydrogen gas environment has a tensile strength of 560 MPa or higher, and a fracture toughness value $K_{IH}$ exhibited by the steel material in a high-pressure hydrogen gas atmosphere is 40 MPa·m$^{1/2}$ or higher.

(9) A method for producing a steel material for a high-pressure hydrogen gas environment which comprises subjecting a steel material having a composition containing, in mass %, C: 0.04 to 0.50%, Si: 0.5 to 2.0%, Mn: 0.5 to 2.0%, P: 0.05% or less, S: 0.010% or less, N: 0.0005 to 0.0080%, Al: 0.010% to 2.0%, O: 0.0100% or less, and Cu: 0.5 to 2.0%, with the balance being Fe and incidental impurities, the steel material being formed to have a predetermined shape, to a reheating-quenching-tempering process, in which the steel material is heated to a temperature of $Ac_3$ transformation temperature or higher, the steel material is subsequently subjected to water quenching or oil quenching, and further, the steel material is tempered at a temperature of $Ac_1$ transformation temperature or lower, wherein the steel material for a high-pressure hydrogen gas environment has a tensile strength of 560 MPa or higher, and a fracture toughness value $K_{IH}$ exhibited by the steel material in a high-pressure hydrogen gas atmosphere is 40 MPa·m$^{1/2}$ or higher.

(10) The method for producing a steel material for a high-pressure hydrogen gas environment according to any one of (7) to (9), wherein the composition contains, in mass %, Al: 0.5 to 2.0%.

(11) The method for producing a steel material for a high-pressure hydrogen gas environment according to any one of (7) to (10), wherein the composition additionally contains, in mass %, one or more selected from Ni: 0.05 to 2.00%, Cr: 0.10 to 2.50%, Mo: 0.05 to 2.00%, W: 0.05 to 2.00%, Nb: 0.005 to 0.100%, V: 0.005 to 0.200%, Ti: 0.005 to 0.100%, and B: 0.0005 to 0.0050%.

(12) The method for producing a steel material for a high-pressure hydrogen gas environment according to any one of (7) to (11), wherein the composition additionally contains, in mass %, one or more selected from Nd: 0.005 to 1.000%, Ca: 0.0005 to 0.0050%, Mg: 0.0005 to 0.0050%, and REM: 0.0005 to 0.0050%.

Advantageous Effects

With the disclosed embodiments, a steel material having significantly improved hydrogen embrittlement resistance exhibited in a high-pressure hydrogen gas environment can be easily and conveniently produced, and, therefore, a remarkable industrial effect is provided. Furthermore, with the disclosed embodiments, the following effect is also provided: the hydrogen embrittlement resistance of steel structures such as storage tanks for high-pressure hydrogen gas and line pipes for high-pressure hydrogen gas is noticeably improved, and, therefore, the fatigue resistance thereof is improved; as a result, a significant contribution is made to the extension of the life of steel structures.

DETAILED DESCRIPTION

A steel material of the disclosed embodiments has, as a basic composition, a composition containing, in mass %, C: 0.04 to 0.50%, Si: 0.5 to 2.0%, Mn: 0.5 to 2.08, P: 0.05% or less, S: 0.010% or less, N: 0.0005 to 0.0080%, Al: 0.010% to 2.0%, O: 0.0100% or less, and Cu: 0.5 to 2.0%, with the balance being Fe and incidental impurities.

First, reasons for the limitations on the composition of the steel material of the disclosed embodiments will be described. Note that in the following description, "mass %" in the context of a composition will be denoted simply as "%".

Studies performed by the inventor discovered that when a material is deformed in a hydrogen gas, Si, Cu, and Al, with Al being optional, enable the resulting dislocation to have a vein structure, thereby producing an effect of increasing the fracture toughness value $K_{IH}$ exhibited in hydrogen gas. Accordingly, hydrogen embrittlement resistance is improved. This effect is noticeable at least in instances in which Si and Cu are included each in an amount of 0.5% or more, and the effect is more noticeable in instances in which Al is optionally included in an amount of 0.5% or more. Hence, in the disclosed embodiments, Si: 0.5 to 2.0% and Cu: 0.5 to 2.0% are included, and, optionally, Al: 0.5 to 2.0% is included.

Si: 0.5 to 2.0%

Similar to Cu and Al, Si is an element that improves hydrogen embrittlement resistance. In the disclosed embodiments, Si is to be present in an amount more than or equal to 0.5%. On the other hand, if a large amount of Si is present, that is, an amount more than 2.0%, the grain boundaries become brittle, and, therefore, toughness is degraded. Accordingly, the amount of Si is limited to a range of 0.5 to 2.0%. Note that the amount is preferably more than or equal to 0.75% and less than or equal to 2.00%. More preferably, the amount is more than or equal to 1.00%.

Cu: 0.5 to 2.0%

Similar to Si and Al, Cu is an element that improves hydrogen embrittlement resistance. In the disclosed embodiments, Cu is to be present in an amount more than or equal to 0.5%. On the other hand, if a large amount of Cu is present, that is, an amount more than 2.0%, susceptibility to hot cracking, which may occur during heating or welding, is increased. Accordingly, the amount of Cu is limited to a range of 0.5 to 2.0%. Note that the amount is preferably more than or equal to 0.75% and less than or equal to 2.008. More preferably, the amount is more than or equal to 1.00%.

Al: 0.010% to 2.0%

Similar to Si and Cu, Al is an element that contributes to improving hydrogen embrittlement resistance. Even when being present in a relatively small amount, Al acts as a deoxidizer and forms a nitride AlN to inhibit the coarsening of grains, which may occur during heating, thereby contributing to refining a microstructure. To produce these effects, the amount of Al is specified to be more than or equal to 0.010% in the disclosed embodiments. On the other hand, if a large amount of Al is present, that is, an amount more than 2.0%, susceptibility to surface defects in the steel material is increased. Note that in terms of noticeably improving hydrogen embrittlement resistance, it is preferable that the amount of Al be more than or equal to 0.5% and less than or equal to 2.08. More preferably, the amount is more than or equal to 0.75%, and even more preferably more than or equal to 1.00%.

Note that reasons for the limitations on the components other than Si, Cu, or Al are as follows.

C: 0.04 to 0.50%

C is an element that contributes to increasing strength and improves hardenability. C needs to be present in an amount more than or equal to 0.04% so that a desired strength and hardenability can be ensured. On the other hand, if C is present in an amount more than 0.50%, weldability is significantly degraded, and the toughness of the base metal and a weld heat affected zone is degraded. Accordingly, the amount of C is limited to a range of 0.04 to 0.50%. Note that the amount is preferably more than or equal to 0.10% and less than or equal to 0.45%.

Mn: 0.5 to 2.0%,

Mn is an element that contributes to increasing strength by improving hardenability. Producing this effect requires the presence of Mn in an amount more than or equal to 0.5%. However, if Mn is present in an amount more than 2.0%, grain boundary strength is degraded, and, therefore, low-temperature toughness is degraded. Accordingly, the amount of Mn is limited to a range of 0.5 to 2.0%. Note that the amount is preferably more than or equal to 0.8% and less than or equal to 1.5%.

P: 0.05% or less

P tends to be segregated at grain boundaries and the like, which degrades the bonding strength of grains, which in turn degrades toughness. Accordingly, it is desirable that an amount of P be as low as possible; a permissible amount of P is up to 0.05%. Hence, the amount of P is limited to less than or equal to 0.05%.

S: 0.010% or less

S tends to be segregated at grain boundaries and tends to form MnS, which is a non-metallic inclusion; consequently, ductility and toughness are degraded. Accordingly, it is desirable that an amount of S be as low as possible; a permissible amount of S is up to 0.010%. Hence, the amount of S is limited to less than or equal to 0.010%.

N: 0.0005 to 0.0080%

N combines with nitride-forming elements, such as Nb, Ti, and Al, to form nitrides, which pin austenite grains to inhibit the coarsening of grains during heating; therefore, N has an effect of refining the microstructure. Producing the microstructure-refining effect requires the presence of N in an amount more than or equal to 0.0005%. On the other hand, if N is present in an amount more than 0.0080%, an amount of dissolved N is increased, and, consequently, the toughness of the base metal and a weld heat affected zone is degraded. Accordingly, the amount of N is limited to a range of 0.0005 to 0.0080%. Note that the amount is preferably more than or equal to 0.0020% and less than or equal to 0.0050%.

O: 0.0100% or less

O (oxygen) increases an amount of non-metallic inclusions by forming oxides, such as alumina, which results in degradation of workability, for example, degradation of ductility. Accordingly, it is desirable that an amount of O (oxygen) be as low as possible; a permissible amount of O (oxygen) is up to 0.0100%. Accordingly, the amount of O (oxygen) is limited to less than or equal to 0.0100%. Note that the amount is preferably less than or equal to 0.0050%.

The basic composition described above includes the components described above. In addition to the basic composition described above, any of the following optional elements may be selected and included: one or more selected from Ni: 0.05 to 2.00%, Cr: 0.10 to 2.50%, Mo: 0.05 to 2.00%, W: 0.05 to 2.00%, Nb: 0.005 to 0.100%, V: 0.005 to 0.200%, Ti: 0.005 to 0.100%, and B: 0.0005 to 0.0050% and/or one or more selected from Nd: 0.005 to 1.000%, Ca: 0.0005 to 0.0050%, Mg: 0.0005 to 0.0050%, and one or more REMs: 0.0005 to 0.0050%.

Ni, Cr, Mo, W, Nb, V, Ti, and B are all elements that contribute to improving hardenability. One or more of these may be selected as necessary and included.

Ni: 0.05 to 2.00%

Ni is an element that has an effect of improving toughness in addition to improving hardenability. Producing these effects requires the presence of Ni in an amount more than or equal to 0.058. On the other hand, if Ni is present in an amount more than 2.00%, a material cost is increased, and, therefore, an economic advantage is reduced. Accordingly, in instances where Ni is to be present, it is preferable that the amount of Ni be limited to a range of 0.05 to 2.00%. Note that the amount is more preferably more than or equal to 0.50% and less than or equal to 1.50%.

Cr: 0.10 to 2.50%

Cr is an element that contributes to ensuring a strength by improving hardenability. Producing this effect requires the presence of Cr in an amount more than or equal to 0.10%. On the other hand, if a large amount of Cr is present, that is, an amount more than 2.50%, weldability is degraded. Accordingly, in cases where Cr is to be present, it is preferable that the amount of Cr is limited to a range of 0.10 to 2.50%. Note that the amount is more preferably more than or equal to 0.50% and less than or equal to 1.50%.

Mo: 0.05 to 2.00%

Mo is an element that contributes to ensuring a strength by improving hardenability. Producing this effect requires the presence of Mo in an amount more than or equal to 0.05%. On the other hand, if a large amount of Mo is present, that is, an amount more than 2.00%, a material cost is increased, and, therefore, an economic advantage is reduced. Accordingly, in instances where Mo is to be present, it is preferable that the amount of Mo be limited to a range of 0.05 to 2.00%. Note that the amount is more preferably more than or equal to 0.20% and less than or equal to 1.50%.

W: 0.05 to 2.00%

W is an element that contributes to ensuring a strength by improving hardenability. Producing this effect requires the presence of W in an amount more than or equal to 0.05%. On the other hand, if a large amount of W is present, that is, an amount more than 2.00%, weldability is degraded. Accordingly, in instances where W is to be present, it is preferable that the amount of W be limited to 0.05 to 2.00%. Note that the amount is more preferably more than or equal to 0.20% and less than or equal to 1.50%.

Nb: 0.005 to 0.100%

Nb is an element that has an effect of improving hardenability and, in addition, an effect of inhibiting the coarsening of grains during heating as Nb is finely precipitated as carbonitrides to pin austenite grains. These effects can be observed in cases in which Nb is present in an amount more than or equal to 0.005%. On the other hand, if Nb is present in an amount more than 0.100%, the toughness of a weld heat affected zone is degraded. Accordingly, in instances where Nb is to be present, it is preferable that the amount of Nb be limited to a range of 0.005 to 0.100%. Note that the amount is more preferably more than or equal to 0.010% and less than or equal to 0.050%.

V: 0.005 to 0.200%

V is an element that has an effect of improving hardenability and, in addition, an effect of inhibiting the coarsening of grains during heating as V is finely precipitated as carbonitrides to pin austenite grains. These effects can be observed in cases in which V is present in an amount more than or equal to 0.005%. On the other hand, if V is present in an amount more than 0.200%, the toughness of a weld heat affected zone is degraded. Accordingly, in instances where V is to be present, it is preferable that the amount of V be limited to a range of 0.005 to 0.200%. Note that the amount is more preferably more than or equal to 0.010% and less than or equal to 0.150%.

Ti: 0.005 to 0.100%

Ti is an element that has an effect of improving hardenability and, in addition, an effect of inhibiting the coarsening of grains during heating as Ti is finely precipitated as carbonitrides to pin austenite grains. These effects can be observed in cases in which Ti is present in an amount more than or equal to 0.005%. On the other hand, if Ti is present in an amount more than 0.100%, the toughness of a weld heat affected zone is degraded. Accordingly, in instances where Ti is to be present, it is preferable that the amount of Ti be limited to a range of 0.005 to 0.100%. Note that the amount is more preferably more than or equal to 0.010% and less than or equal to 0.050%.

B: 0.0005 to 0.0050%

B is an element that contributes to improving hardenability even when B is present in a small amount. Producing this effect requires the presence of B in an amount more than or equal to 0.0005%. On the other hand, if B is present in an amount more than 0.0050%, toughness is degraded. Accordingly, in instances where B is to be present, it is preferable that the amount of B be limited to a range of 0.0005 to 0.0050%. Note that the amount is more preferably more than or equal to 0.0010% and less than or equal to 0.0020%.

Furthermore, Nd, Ca, Mg, and REMs are all elements that contribute to improving ductility, toughness, and hydrogen embrittlement resistance by controlling the morphology of inclusions. One or more of these may be selected as necessary and included.

Nd: 0.005 to 1.000%

Nd is an element that combines with S to form sulfide inclusions, thereby reducing an amount of grain boundary segregation of S and thus contributing to improving toughness and hydrogen brittleness resistance. Producing this effect requires the presence of Nd in an amount more than or equal to 0.005%. On the other hand, if Nd is present in an amount more than 1.000%, the toughness of a weld heat affected zone is degraded. Accordingly, in instances where Nd is to be present, it is preferable that the amount of Nd be limited to a range of 0.005 to 1.000%. Note that the amount is more preferably more than or equal to 0.010% and less than or equal to 0.500%.

Ca: 0.0005 to 0.0050%

Ca has high affinity for S and forms CaS in place of MnS; CaS is a globular sulfide inclusion, which is not easily elongated in rolling as opposed to MnS, which is a sulfide inclusion that is easily elongated in rolling. Accordingly, Ca is an element that contributes to controlling the morphology of sulfide inclusions and has an effect of improving ductility and toughness. Producing this effect requires the presence of Ca in an amount more than or equal to 0.0005%. On the other hand, if Ca is present in an amount more than 0.0050%, cleanliness is degraded, and ductility, toughness, and the like are degraded. Accordingly, in instances where Ca is to be present, it is preferable that the amount of Ca be limited to a range of 0.0005 to 0.0050%. Note that the amount is more preferably more than or equal to 0.0010% and less than or equal to 0.0020%.

Mg: 0.0005 to 0.0050%

Similar to Ca, Mg has high affinity for S and forms sulfide inclusions, thereby improving ductility and toughness. Producing this effect requires the presence of Mg in an amount more than or equal to 0.0005%. On the other hand, if Mg is present in an amount more than 0.0050%, cleanliness is degraded. Accordingly, in instances where Mg is to be present, it is preferable that the amount of Mg be limited to a range of 0.0005 to 0.0050%. Note that the amount is more preferably more than or equal to 0.0010% and less than or equal to 0.0020%.

One or more REMs: 0.0005 to 0.0050%

REMs are elements that form sulfide inclusions, such as REM (O, S), to reduce an amount of dissolved S at grain boundaries, thereby contributing to improving SR cracking resistance. Producing this effect requires the presence of one or more REMs in an amount more than or equal to 0.0005%. On the other hand, if one or more REMs are present in an amount more than 0.0050%, large amounts of REM sulfide inclusions accumulate in a sedimentation zone during casting, and, consequently, material properties, such as ductility and toughness, are degraded. Accordingly, in instances where one or more REMs are to be present, it is preferable that the amount of one or more REMs be limited to a range of 0.0005 to 0.0050%. Note that the amount is more preferably more than or equal to 0.0010% and less than or equal to 0.0020%. Note that as used herein, the term "REM" is an abbreviation of "rare earth metal".

The balance, other than the components described above, is Fe and incidental impurities.

Steel materials for a high-pressure hydrogen gas environment of the disclosed embodiments are steel materials that have the composition described above and have a microstructure formed of a combination of ferrite and pearlite or formed of lower bainite, martensite, tempered lower bainite, tempered martensite, or a combination of any of these.

Furthermore, the steel materials for a high-pressure hydrogen gas environment of the disclosed embodiments are steel materials that have the composition described above and the microstructure described above, the steel materials have a high strength of 560 MPa or higher in terms of tensile strength, and a fracture toughness value $K_{IH}$ exhibited by the steel materials in a high-pressure hydrogen gas atmosphere is 40 MPa·m/2 or higher; therefore, the steel materials have excellent hydrogen embrittlement resistance.

Now, preferred methods of the disclosed embodiments for producing a steel material for a high-pressure hydrogen gas environment will be described.

First, molten steel having the composition described above is produced in a common steel-making furnace, such as a converter or an electric furnace, and the molten steel is subjected to a continuous casting process to form a cast steel having a predetermined shape, such as a slab, or the molten steel is subjected to an ingot casting process or the like, in which a cast steel (steel ingot) is hot-rolled to form a workpiece having a predetermined shape, such as a slab; accordingly, a steel starting material is formed.

Subsequently, the obtained steel starting material is loaded into a heating furnace. A heating temperature is $Ac_3$ transformation temperature or higher. If the heating temperature is less than $Ac_3$ transformation temperature, the material to be rolled has a high deformation resistance, which results in an excessive load on a rolling machine, and in addition, a partial untransformed constituent remains; consequently, the desired characteristics cannot be ensured even with subsequent processing. Note that the heating temperature is preferably 1100 to 1300° C. If the heating temperature is less than 1100° C., the deformation resistance is high, which results in an excessively high load on a rolling machine. On the other hand, if the heating temperature is higher than 1300° C., coarsening of grains occurs, which results in degraded toughness.

Subsequently, the steel starting material, which has been heated to a predetermined temperature, is subjected to hot rolling to form a steel material having a predetermined size and shape. As used herein, the term "steel material" encompasses sheets, plates, steel pipes, shaped steels, steel bars, and the like. Furthermore, as used herein, the term "hot rolling" is not meant to specify any particular rolling conditions; it is sufficient that the hot rolling can form a steel material having a predetermined size and shape. In instances where the steel material is a seamless steel pipe, the hot rolling is rolling that includes piercing rolling.

It is preferable that the steel material rolled to have a predetermined size and shape be processed in any of the following manners: the steel material is allowed to cool to room temperature and, after having been cooled, subjected to a reheating-quenching-tempering process, in which the steel material is reheated, quenched, and tempered; after the hot rolling, the steel material is subjected to an accelerated cooling process; or after the hot rolling, the steel material is subjected to a direct quenching-tempering process.

Now, the accelerated cooling process, the direct quenching-tempering process, and the reheating-quenching-tempering process will be described individually.

Note that the temperature specified in the production conditions is a temperature of a middle portion of the steel material. In instances where the steel material is a sheet, plate, steel pipe, or shaped steels, the middle portion is a middle of a thickness (wall thickness), and in instances where the steel material is a steel bar, the middle portion is a middle in a radial direction. Since the vicinity of the middle portion has a substantially uniform temperature history, the temperature specified is not limited to the temperature of the exact middle.

(Accelerated Cooling Process)

The steel material rolled to have a predetermined size and shape is thereafter, without being cooled to room temperature, subjected to an accelerated cooling process; in the accelerated cooling process, the steel material is cooled from a cooling start temperature of ($Ar_3$ transformation temperature −50° C.) or higher to a cooling stop temperature of 600° C. or lower at a cooling rate of 1 to 200° C./s. If the cooling start temperature is less than ($Ar_3$ transformation temperature −50° C.), an amount of transformation of austenite is increased before the start of the cooling, and, consequently, the characteristics that exist after the accelerated cooling are not the desired ones. Accordingly, the cooling start temperature is limited to a temperature of ($Ar_3$ transformation temperature −50° C.) or higher. Furthermore, if the cooling rate for the accelerated cooling is less than 1° C./s, the cooling is too slow, and, consequently, the desired characteristics cannot be ensured. On the other hand, in cases where a typical cooling method is used, the cooling rate does not exceed 200° C./s. Accordingly, the cooling rate for the accelerated cooling process is limited to the range of 1 to 200° C./s. Note that the cooling rate is an average cooling rate in a thickness (wall thickness) middle. The means for the cooling need not be particularly limited, and it is preferable that water cooling, for example, be used. Furthermore, if the cooling stop temperature for the accelerated cooling is a high temperature of higher than 600° C., a desired transformation is not accomplished, and, therefore, the desired characteristics cannot be ensured. Accordingly, the cooling stop temperature for the accelerated cooling is limited to a temperature of 600° C. or lower.

(Direct Quenching-Tempering Process)

The steel starting material is heated to a temperature of the $Ac_3$ transformation temperature or higher and hot-rolled to form a steel material having a predetermined size and shape; thereafter, the steel material is subjected to a quenching process, in which the steel material is cooled from a temperature of ($Ar_3$ transformation temperature-50° C.) or higher to a cooling stop temperature of 250° C. or lower at a cooling rate of 1 to 200° C./s; and thereafter, the steel material is subjected to a tempering process, in which the steel material is tempered at a tempering temperature of $Ac_1$ transformation temperature or lower. If the heating temperature for the steel starting material is less than the $Ac_3$ transformation temperature, a partial untransformed constituent remains, and consequently, the microstructure that exists after the hot rolling and the quenching-tempering is not a desired one. Accordingly, the heating temperature before the hot rolling is specified to be $Ac_3$ transformation temperature or higher. Furthermore, if the starting temperature for the quenching after the hot rolling is less than (Arg transformation temperature −50° C.), the amount of transformation of austenite before the quenching is increased, and consequently, the microstructure that exists after the quenching-tempering is not a desired one. Accordingly, after the hot rolling, the cooling is to be started at a temperature of ($Ar_3$ transformation temperature −50° C.) or higher to carry out the quenching. For the quenching that starts at ($Ar_3$ transformation temperature-50° C.) or higher, the cooling rate is specified to be 1 to 200° C./s to obtain a desired microstructure. Note that the cooling rate is an average cooling rate in a thickness middle. The means for the cooling need not be particularly limited, and, for example, water cooling may be used. Furthermore, if the cooling rate for the quenching is less than 1° C./s, the cooling is too slow, and, consequently, the desired characteristics cannot be ensured. On the other hand, in cases where a typical cooling method is used, the cooling rate does not exceed 200° C./s. Furthermore, if the quenching is stopped at a temperature of higher than 250° C., desired martensitic transformation and/or bainitic transformation are not accomplished, and, consequently, the characteristics that exist after the tempering are not the desired ones. Accordingly, in the quenching process, the cooling is to be performed until a temperature of 250° C. or lower is reached. After the quenching, the steel material is tempered at a temperature of $Ac_1$ transformation temperature or lower. If the tempering temperature is higher than $Ac_1$ transformation temperature, partial austenite transformation occurs, and, consequently, the characteristics that exist after the tempering are not the desired ones.

(Reheating-Quenching-Tempering Process)

The steel material rolled to have a predetermined size and shape is then cooled to room temperature, and subsequently, the steel material is subjected to a reheating-quenching-tempering process, in which the steel material is heated at a quenching heating temperature of $Ac_3$ transformation temperature or higher; thereafter, the steel material is subjected to a quenching process, in which the steel material is cooled from a quenching start temperature of ($Ar_3$ transformation temperature $-50°$ C.) or higher to a temperature of $250°$ C. or lower at a cooling rate of 0.5 to $100°$ C./s; and subsequently, the steel material is tempered at a temperature of $Ac_1$ transformation temperature or lower.

Note that it is preferable that the quenching process be carried out in the following manner: water or oil, for example, is used as a cooling medium, and the cooling medium is sprayed onto the steel material, which is the cooling target heated to a high temperature, in a manner such that a cooling rate of 0.5 to $100°$ C./s is achieved, or the heated steel material is immersed in a tank that holds the cooling medium. From the standpoint of achieving uniform cooling, it is preferable that in a tank that holds the cooling medium, the steel material having a predetermined size and shape be cooled by a jet stream of the cooling medium sprayed thereto while the steel material is rotated. Furthermore, regarding the tempering process, the steel material heated in a tempering heating furnace or the like may be allowed to cool in air or a protective atmosphere.

If the quenching heating temperature is less than $Ac_3$ transformation temperature, a partial untransformed constituent remains, and, consequently, the characteristics that exist after the quenching-tempering are not the desired ones. Accordingly, the quenching heating temperature is specified to be $Ac_3$ transformation temperature or higher. Furthermore, if the quenching start temperature is less than ($Ar_3$ transformation temperature $-50°$ C.), the transformation of the austenite begins before the start of the quenching, and, consequently, the characteristics that exist after the quenching-tempering are not the desired ones. Accordingly, the quenching start temperature is limited to a temperature of ($Ar_3$ transformation temperature $-50°$ C.) or higher. Furthermore, the cooling rate for the quenching is limited to 0.5 to $100°$ C./s to achieve the desired characteristics and prevent quench cracking. If the quench cooling stop temperature is a high temperature of higher than $250°$ C., a desired transformation (martensitic transformation or bainitic transformation) is not accomplished, and, consequently, the characteristics that exist after the tempering process are not the desired ones. Accordingly, the quench stop temperature is limited to a temperature of $250°$ C. or lower.

After the quenching process, a tempering process is performed in which the steel material is tempered by being heated to a tempering temperature of $Ac_1$ transformation temperature or lower. If the tempering temperature is higher than $Ac_1$ transformation temperature, partial austenite transformation occurs, and, consequently, the characteristics that exist after the tempering process are not the desired ones.

Note that $Ac_3$ transformation temperature (° C.), $Ar_3$ transformation temperature (C), and $Ac_1$ transformation temperature (C) described above, which are used herein, are temperatures calculated by using the following equations.

$Ac_3$(° C.)=854-180C+44Si-14Mn-17.8Ni-1.7Cr $Ar_3$(° C.)=910-310C-80Mn-20Cu-15Cr-55Ni-80Mo $Ac_1$(° C.)=723-14Mn+22Si-14.4Ni+23.3Cr

Here, the chemical symbols represent a content (mass %) of the element in the steel.

The steel material having excellent hydrogen embrittlement resistance produced by the production method described above is suitable for use in steel structures for hydrogen that are used in a high-pressure hydrogen gas environment. Examples of the "steel structures for hydrogen" as referred to herein include storage tanks (hydrogen storage tanks) that are used in hydrogen stations and the like; and line pipes for transportation of hydrogen gas (hydrogen line pipes).

As storage tanks that are used in hydrogen stations and the like, Type 1, Type 2, and Type 3 are known. Type 1 is made exclusively of a steel material, and Type 2 and Type 3 are made of a steel material and a carbon fiber reinforced plastic (CFRP) wound therearound. These types are based on classifications regarding a structure of the container, which are described in, for example, various standards for compressed natural gas vehicle fuel containers, ISO 11439, ANSI/NGV, the Container Safety Rules-Exemplified Standard-Appendix-9 of the High Pressure Gas Safety Act, and the like. Note that it is preferable that the storage tanks be produced, for example, by forming a steel material having the composition described above into a predetermined shape and subsequently subjecting the steel material to the reheating-quenching-tempering process. Note that the design pressure for the hydrogen to be stored in a storage tank is approximately 35 MPa or approximately 70 MPa.

Furthermore, as a line pipe for transportation of hydrogen, a seamless steel pipe, an electric resistance welded steel pipe, or a UOE-type steel pipe is suitable. Note that it is preferable that the line pipe be formed as follows: a steel material having the composition described above is used as it is to form a line pipe (steel pipe), or a steel starting material having the composition described above and subjected to the accelerated cooling process described above or the direct quenching process described above is used to form a steel pipe. Note that, in line pipes, the design pressure for the hydrogen to be used is approximately 10 MPa.

Now, the disclosed embodiments will be further described based on examples.

Examples

Molten steel having a composition as shown in Table 1 was produced in a converter and continuously cast to form cast steel (a slab, wall thickness: 250 mm). The obtained cast steel was heated and hot-rolled to form a steel plate (thickness: 38 mm), which was then cooled to room temperature. Subsequently, the steel plate was subjected to a reheating-quenching-tempering process under the conditions shown in Table 2 (steel plates No. 1 to No. 16 and No. 21 to No. 23). Note that the quenching process was carried out by using water cooling or oil cooling.

Furthermore, the obtained cast steel was heated under the condition shown in Table 2 and hot-rolled to form a steel plate having a predetermined thickness (38 mm), and thereafter, the steel plate was subjected to an accelerated cooling process, which was performed under the conditions shown in Table 2 (steel plates No. 17 and No. 18).

Furthermore, the obtained cast steel was heated under the condition shown in Table 2 and hot-rolled to form a steel plate having a predetermined thickness (38 mm). Thereafter, the steel plate was subjected to a direct quenching-tempering process, in which the steel plate was directly quenched under the conditions shown in Table 2 and was subsequently tempered at the tempering temperature shown in Table 2 (steel plates No. 19 and No. 20). Note that the temperature of the steel plate was measured by using a thermocouple inserted in a thickness middle portion.

The reheating-quenching-tempering process was intended to simulate the production of a hydrogen storage tank, and the accelerated cooling process and the direct quenching process were both intended to simulate the production of a hydrogen line pipe (steel pipe).

A tensile test, a fracture toughness test, and microstructure examination were conducted on the obtained steel plates. The test methods were as follows.

(1) Tensile Properties

A full-thickness tensile test piece was cut from the obtained steel plate in accordance with JIS Z 2201 (1980) such that a longitudinal direction (tensile direction) of the test piece coincided with a rolling direction, and a tensile test was conducted in accordance with the specifications of JIS Z 2241 to measure the tensile strength.

(2) Fracture Toughness Test

A CT test piece (width: 50.8 mm) was cut from each of the obtained steel plates such that the load application direction was parallel to the rolling direction. A fracture toughness test was conducted in a high-pressure hydrogen gas atmosphere in accordance with The Japan Pressure container Research Council, Division of Materials Science and Technology, Hydrogen Gas Embrittlement Technical Committee, Task Group V (1991). Accordingly, the fracture toughness value $K_{IH}$ was determined. Note that the test was conducted in a high-pressure hydrogen gas atmosphere at room temperature (20±10° C.) and a pressure of 115 MPa at a constant displacement speed of 2.5 μm/min.

Note that, in some instances, a fracture toughness test in accordance with the specifications of ASTM E399 or ASTM E1820 was also conducted to obtain fracture toughness values $K_{IH}$. These fracture toughness values $K_{IH}$ were not shown in Table 2 because these fracture toughness values $K_{IH}$ were substantially equal to the fracture toughness values $K_{IH}$ obtained in the fracture toughness test conducted in accordance with The Japan Pressure container Research Council, Division of Materials Science and Technology, Hydrogen Gas Embrittlement Technical Committee, Task Group V (1991), with an error of not larger than 5%.

(3) Microstructure Examination

A test piece for microstructure examination was cut from a thickness middle portion of the obtained steel plate, the test piece was polished and etched (with a nital solution), and examination was conducted with an optical microscope (magnification: 200×). Accordingly, the constituents were identified, and the fractions of the constituents were calculated by the image analysis.

The results obtained are shown in Table 2.

TABLE 1

| Steel No. | Chemical components (mass %) | | | | | | | | | | Nd, W, Ca, Mg, REM | Notes |
| --- | --- | --- | --- | --- | --- | --- | --- | --- | --- | --- | --- | --- |
| | C | Si | Mn | P | S | Al | N | O | Cu | Ni, Cr, Mo, Nb, V, Ti, B | | |
| A | 0.36 | 0.42 | 0.76 | 0.02 | 0.0031 | 0.051 | 0.0035 | 0.0033 | 0.56 | Ni:0.32, Cr:1.06, Mo:1.08, Nb:0.023, V:0.041, Ti:0.012, B:0.0010 | Ca:0.0012 | Comparative example |
| B | 0.36 | 0.54 | 0.76 | 0.02 | 0.0031 | 0.051 | 0.0035 | 0.0033 | 0.56 | Ni:0.32, Cr:1.06, Mo:1.08, Nb:0.023, V:0.041, Ti:0.012, B:0.0010 | Ca:0.0012 | Conforming example |
| C | 0.36 | 1.02 | 0.76 | 0.02 | 0.0031 | 0.051 | 0.0035 | 0.0033 | 0.56 | Ni:0.32, Cr:1.06, Mo:1.08, Nb:0.023, V:0.041, Ti:0.012, B:0.0010 | Ca:0.0012 | Conforming example |
| D | 0.36 | 1.96 | 0.76 | 0.02 | 0.0031 | 0.051 | 0.0035 | 0.0033 | 0.56 | Ni:0.32, Cr:1.06, Mo:1.08, Nb:0.023, V:0.041, Ti:0.012, B:0.0010 | Ca:0.0012 | Conforming example |
| E | 0.36 | 0.56 | 0.76 | 0.02 | 0.0031 | 0.051 | 0.0035 | 0.0033 | 0.42 | Ni:0.32, Cr:1.06, Mo:1.08, Nb:0.023, V:0.041, Ti:0.012, B:0.0010 | Ca:0.0012 | Comparative example |
| F | 0.36 | 0.56 | 0.76 | 0.02 | 0.0031 | 0.051 | 0.0035 | 0.0033 | 0.53 | Ni:0.32, Cr:1.06, Mo:1.08, Nb:0.023, V:0.041, Ti:0.012, B:0.0010 | Ca:0.0012 | Conforming example |
| G | 0.36 | 0.56 | 0.76 | 0.02 | 0.0031 | 0.051 | 0.0035 | 0.0033 | 0.99 | Ni:0.32, Cr:1.06, Mo:1.08, Nb:0.023, V:0.041, Ti:0.012, B:0.0010 | Ca:0.0012 | Conforming example |
| H | 0.36 | 0.56 | 0.76 | 0.02 | 0.0031 | 0.051 | 0.0035 | 0.0033 | 1.97 | Ni:0.32, Cr:1.06, Mo:1.08, Nb:0.023, V:0.041, Ti:0.012, B:0.0010 | Ca:0.0012 | Conforming example |
| I | 0.36 | 0.56 | 0.76 | 0.02 | 0.0031 | 0.008 | 0.0035 | 0.0033 | 0.56 | Ni:0.32, Cr:1.06, Mo:1.08, Nb:0.023, V:0.041, Ti:0.012, B:0.0010 | Ca:0.0012 | Comparative example |
| J | 0.36 | 0.56 | 0.76 | 0.02 | 0.0031 | 0.52 | 0.0035 | 0.0033 | 0.56 | Ni:0.32, Cr:1.06, Mo:1.08, Nb:0.023, V:0.041, Ti:0.012, B:0.0010 | Ca:0.0012 | Conforming example |
| K | 0.36 | 0.56 | 0.76 | 0.02 | 0.0031 | 0.97 | 0.0035 | 0.0033 | 0.56 | Ni:0.32, Cr:1.06, Mo:1.08, Nb:0.023, V:0.041, Ti:0.012, B:0.0010 | Ca:0.0012 | Conforming example |
| L | 0.36 | 0.56 | 0.76 | 0.02 | 0.0031 | 1.96 | 0.0035 | 0.0033 | 0.56 | Ni:0.32, Cr:1.06, Mo:1.08, Nb:0.023, V:0.041, Ti:0.012, B:0.0010 | Ca:0.0012 | Conforming example |
| M | 0.06 | 0.54 | 0.76 | 0.01 | 0.0031 | 0.051 | 0.0035 | 0.0033 | 0.53 | Ni:0.32, Cr:1.06, Mo:1.08, Nb:0.023, V:0.041, Ti:0.012, B:0.0010 | Ca:0.0012, Nd:0.21, W:0.15, Mg:0.0006, REM:0.0005 | Conforming example |

TABLE 1-continued

| Steel No. | Chemical components (mass %) | | | | | | | | | | | Notes |
|---|---|---|---|---|---|---|---|---|---|---|---|---|
| | C | Si | Mn | P | S | Al | N | O | Cu | Ni, Cr, Mo, Nb, V, Ti, B | Nd, W, Ca, Mg, REM | |
| N | 0.06 | 0.54 | 0.76 | 0.01 | 0.0031 | 0.52 | 0.0035 | 0.0033 | 0.56 | Ni:0.32, Cr:1.06, Mo:1.08, Nb:0.023, V:0.041, Ti:0.012, B:0.0010 | Ca:0.0012, Nd:0.21, W:0.15, Mg:0.0006, REM:0.0005 | Conforming example |
| O | 0.06 | 0.56 | 0.76 | 0.01 | 0.0031 | 0.52 | 0.0035 | 0.0033 | 0.53 | Ni:0.32, Cr:1.06, Mo:1.08, Nb:0.023, V:0.041, Ti:0.012, B:0.0010 | Ca:0.0012, Nd:0.21, W:0.15, Mg:0.0006, REM:0.0005 | Conforming example |
| P | 0.06 | 0.54 | 0.76 | 0.01 | 0.0031 | 0.52 | 0.0035 | 0.0033 | 0.53 | Ni:0.32, Cr:1.06, Mo:1.08, Nb:0.023, V:0.041, Ti:0.012, B:0.0010 | Ca:0.0012, Nd:0.21, W:0.15, Mg:0.0006, REM:0.0005 | Conforming example |
| Q | 0.48 | 1.02 | 1.82 | 0.01 | 0.0006 | 1.02 | 0.0035 | 0.0033 | 1.02 | — | — | Conforming example |
| R | 0.48 | 1.02 | 1.82 | 0.01 | 0.0006 | 1.02 | 0.0035 | 0.0033 | 1.02 | Ni:0.32, Cr:1.06, Mo:1.08, Nb:0.023, V:0.041, Ti:0.012, B:0.0010 | — | Conforming example |
| S | 0.48 | 1.02 | 1.82 | 0.01 | 0.0006 | 1.02 | 0.0035 | 0.0033 | 1.02 | — | Ca:0.0012 | Conforming example Conforming |

The underline indicates the value is outside the range of the disclosed emodiments.

TABLE 2

| Steel plate No. | Steel No. | Transformation temperature (° C.) | | | Thickness of steel plate (mm) | Type of production method* | Heating of temperature (° C.) | Cooling | | | | Tempering temperature (° C.) | Constituent** and fraction thereof (area %) | Test results | | Notes |
|---|---|---|---|---|---|---|---|---|---|---|---|---|---|---|---|---|
| | | | | | | | | Means for cooling | Cooling start temperature (° C.) | Cooling stop temperature (° C.) | Cooling rate (° C./s) | | | Tensile strength (MPa) | Fracture toughness value $K_{IH}$ (MPa·m$^{1/2}$) | |
| | | Ac$_3$ | Ar$_3$ | Ac$_1$ | | | | | | | | | | | | |
| 1 | A | 790 | 607 | 742 | 38 | RQT | 920 | Oil cooling | 850 | 200 | 10 | 635 | TM | 876 | 36 | Comparative example |
| 2 | B | 795 | 607 | 744 | 38 | RQT | 920 | Oil cooling | 850 | 200 | 10 | 635 | TM | 885 | 83 | Example |
| 3 | C | 816 | 607 | 755 | 38 | RQT | 920 | Oil cooling | 850 | 200 | 10 | 635 | TM | 902 | 97 | Example |
| 4 | D | 858 | 607 | 776 | 38 | RQT | 920 | Oil cooling | 850 | 200 | 10 | 635 | TM | 922 | 111 | Example |
| 5 | E | 796 | 609 | 745 | 38 | RQT | 920 | Oil cooling | 850 | 200 | 10 | 635 | TM | 876 | 36 | Comparative example |
| 6 | F | 796 | 607 | 745 | 38 | RQT | 920 | Oil cooling | 850 | 200 | 10 | 635 | TM | 888 | 81 | Example |
| 7 | G | 796 | 598 | 745 | 38 | RQT | 920 | Oil cooling | 850 | 200 | 10 | 635 | TM | 915 | 95 | Example |
| 8 | H | 796 | 578 | 745 | 38 | RQT | 920 | Oil cooling | 850 | 200 | 10 | 635 | TM | 924 | 97 | Example |
| 9 | I | 796 | 607 | 745 | 38 | RQT | 920 | Oil cooling | 850 | 200 | 10 | 635 | TM | 876 | 36 | Comparative example |
| 10 | J | 796 | 607 | 745 | 38 | RQT | 920 | Oil cooling | 850 | 200 | 10 | 635 | TM | 886 | 77 | Example |
| 11 | K | 796 | 607 | 745 | 38 | RQT | 920 | Oil cooling | 850 | 200 | 10 | 635 | TM | 905 | 89 | Example |
| 12 | L | 796 | 607 | 745 | 38 | RQT | 920 | Oil cooling | 850 | 200 | 10 | 635 | TM | 923 | 91 | Example |
| 13 | M | 849 | 700 | 744 | 38 | RQT | 920 | Water cooling | 850 | 200 | 20 | 680 | TM | 1031 | 122 | Example |
| 14 | N | 849 | 700 | 744 | 38 | RQT | 920 | Water cooling | 850 | 200 | 20 | 680 | TM | 1025 | 117 | Example |
| 15 | O | 850 | 700 | 745 | 38 | RQT | 920 | Water cooling | 850 | 200 | 20 | 680 | TM | 1045 | 112 | Example |
| 16 | P | 849 | 700 | 744 | 38 | RQT | 920 | Water cooling | 850 | 200 | 20 | 680 | TM | 1089 | 155 | Example |
| 17 | M | 849 | 700 | 744 | 38 | AC | 1100 | Water cooling | 850 | 500 | 25 | — | F + P | 566 | 121 | Example |
| 18 | N | 849 | 700 | 744 | 38 | AC | 1100 | Water cooling | 850 | 500 | 25 | — | F + P | 561 | 119 | Example |
| 19 | O | 849 | 700 | 744 | 38 | DQT | 1100 | Water cooling | 850 | 200 | 20 | 680 | TM | 1051 | 110 | Example |
| 20 | P | 850 | 700 | 745 | 38 | DQT | 1100 | Water cooling | 850 | 200 | 20 | 680 | TM | 1097 | 157 | Example |

TABLE 2-continued

| Steel plate No. | Steel No. | Transformation temperature (° C.) Ac₃ | Ar₃ | Ac₁ | Thickness of steel plate (mm) | Type of production meth-od* | Heating of tem-perature (° C.) | Means for cooling | Cooling start tem-perature (° C.) | Cooling stop tem-perature (° C.) | Cool-ing rate (° C./s) | Tempering tem-perature (° C.) | Constituent** and fraction thereof (area %) | Tensile strength (MPa) | Fracture toughness value $K_{IH}$ (MPa·m$^{1/2}$) | Notes |
|---|---|---|---|---|---|---|---|---|---|---|---|---|---|---|---|---|
| 21 | Q | 787 | 595 | 720 | 38 | RQT | 920 | Oil cooling | 850 | 200 | 10 | 500 | TB | 623 | 105 | Example |
| 22 | R | 780 | 475 | 740 | 38 | RQT | 920 | Oil cooling | 850 | 200 | 10 | 500 | TB + TM | 855 | 81 | Example |
| 23 | S | 787 | 595 | 720 | 38 | RQT | 920 | Oil cooling | 850 | 200 | 10 | 500 | TB | 631 | 102 | Example |

*Reheating-quenching-temperature process: RQT, Accelerated cooling process: AC, Direct quenching-tempering process: DQT
**TM: Tempered martensite, TB: Tempered lower bainite, F: Ferrite, P: Pearlite B: Lower bainite, M: Martensite
The underline indicates the value is outside the range of the disclosed embodiments.

In all of the Examples, the fracture toughness value $K_{IH}$ exhibited in a high-pressure hydrogen gas atmosphere at 115 MPa was 40 MPa·m$^{1/2}$ or higher, and, therefore, it can be said that excellent hydrogen embrittlement resistance was achieved. In contrast, in Comparative Examples, which had a composition that is outside the range of the disclosed embodiments, the fracture toughness value $K_{IH}$ exhibited in a high-pressure hydrogen gas atmosphere was less than 40 MPa·m$^{1/2}$, which indicated a low hydrogen embrittlement resistance. Note that in all of the Examples, a high strength of 560 MPa or higher in terms of tensile strength was achieved.

Hence, it was confirmed that the disclosed embodiments enable the production of products (steel structures for hydrogen) having excellent hydrogen embrittlement resistance.

The invention claimed is:

1. A steel material having a chemical composition comprising, by mass %:
   C: 0.04 to 0.50%;
   Si: 0.5 to 2.0%;
   Mn: 0.5 to 2.0%;
   P: 0.05% or less;
   S: 0.010% or less;
   N: 0.0005 to 0.0080%;
   Al: 0.5% to 2.0%;
   O: 0.0100% or less;
   Cu: 0.5 to 2.0%; and
   the balance being Fe and incidental impurities,
   wherein:
   the steel material has a tensile strength of 560 MPa or higher and 1097 MPa or lower, and
   a fracture toughness value $K_{IH}$ exhibited by the steel material in a hydrogen gas atmosphere at 115 MPa is 40 MPa·m$^{1/2}$ or higher.

2. The steel material according to claim 1, wherein the chemical composition further comprises at least one group selected from the following groups:
   Group A: at least one element selected from the group consisting of, by mass %, Ni: 0.05 to 2.00%, Cr: 0.10 to 2.50%, Mo: 0.05 to 2.00%, W: 0.05 to 2.00%, Nb: 0.005 to 0.100%, V: 0.005 to 0.200%, Ti: 0.005 to 0.100%, and B: 0.0005 to 0.0050%, and
   Group B: at least one element selected from the group consisting of, by mass %, Nd: 0.005 to 1.000%, Ca: 0.0005 to 0.0050%, Mg: 0.0005 to 0.0050%, and REM: 0.0005 to 0.0050%.

3. A steel structure comprising the steel material according to claim 2.

4. The steel structure according to claim 3, wherein the steel structure is a storage tank or a line pipe.

5. A steel structure comprising the steel material according to claim 1.

6. The steel structure according to claim 5, wherein the steel structure is a storage tank or a line pipe.

7. A method for producing the steel material according to claim 1, the method comprising:
   heating a steel starting material having the chemical composition to a temperature of Ac₃ transformation temperature or higher and then hot-rolling the steel starting material to form the steel material having a predetermined shape; and
   thereafter subjecting the steel material to an accelerated cooling process, in which the steel material is cooled from a temperature of (Ar₃ transformation temperature-50° C.) or higher to a cooling stop temperature of 600° C. or lower at a cooling rate in a range of 1 to 200° C./s.

8. The method according to claim 7, wherein the chemical composition further comprises at least one group selected from the following groups:
   Group A: at least one element selected from the group consisting of, by mass %, Ni: 0.05 to 2.00%, Cr: 0.10 to 2.50%, Mo: 0.05 to 2.00%, W: 0.05 to 2.00%, Nb: 0.005 to 0.100%, V: 0.005 to 0.200%, Ti: 0.005 to 0.100%, and B: 0.0005 to 0.0050%, and
   Group B: at least one element selected from the group consisting of, by mass %, Nd: 0.005 to 1.000%, Ca: 0.0005 to 0.0050%, Mg: 0.0005 to 0.0050%, and REM: 0.0005 to 0.0050%.

9. A method for producing the steel material according to claim 1, the method comprising:
   heating a steel starting material having the chemical composition to a temperature of Ac₃ transformation temperature or higher and then hot-rolling the steel starting material to form the steel material having a predetermined shape;
   thereafter subjecting the steel material to a direct quenching-tempering process, in which the steel material is cooled from a temperature of (Ar₃ transformation temperature −50° C.) or higher to a cooling stop temperature of 250° C. or lower at a cooling rate in a range of 1 to 200° C./s; and
   tempering the steel material at a temperature of Ac₁ transformation temperature or lower.

10. A method for producing the steel material according to claim 1, the method comprising:
  subjecting the steel material having the chemical composition and being formed to have a predetermined shape, to a reheating-quenching-tempering process, in which the steel material is heated to a temperature of $Ac_3$ transformation temperature or higher;
  subsequently subjecting the steel material to water quenching or oil quenching; and
  tempering the steel material at a temperature of $Ac_1$ transformation temperature or lower.

* * * * *